April 27, 1937. G. L. MOREHEAD 2,078,266
CIRCULAR COLLECTOR
Filed July 12, 1935 4 Sheets-Sheet 2
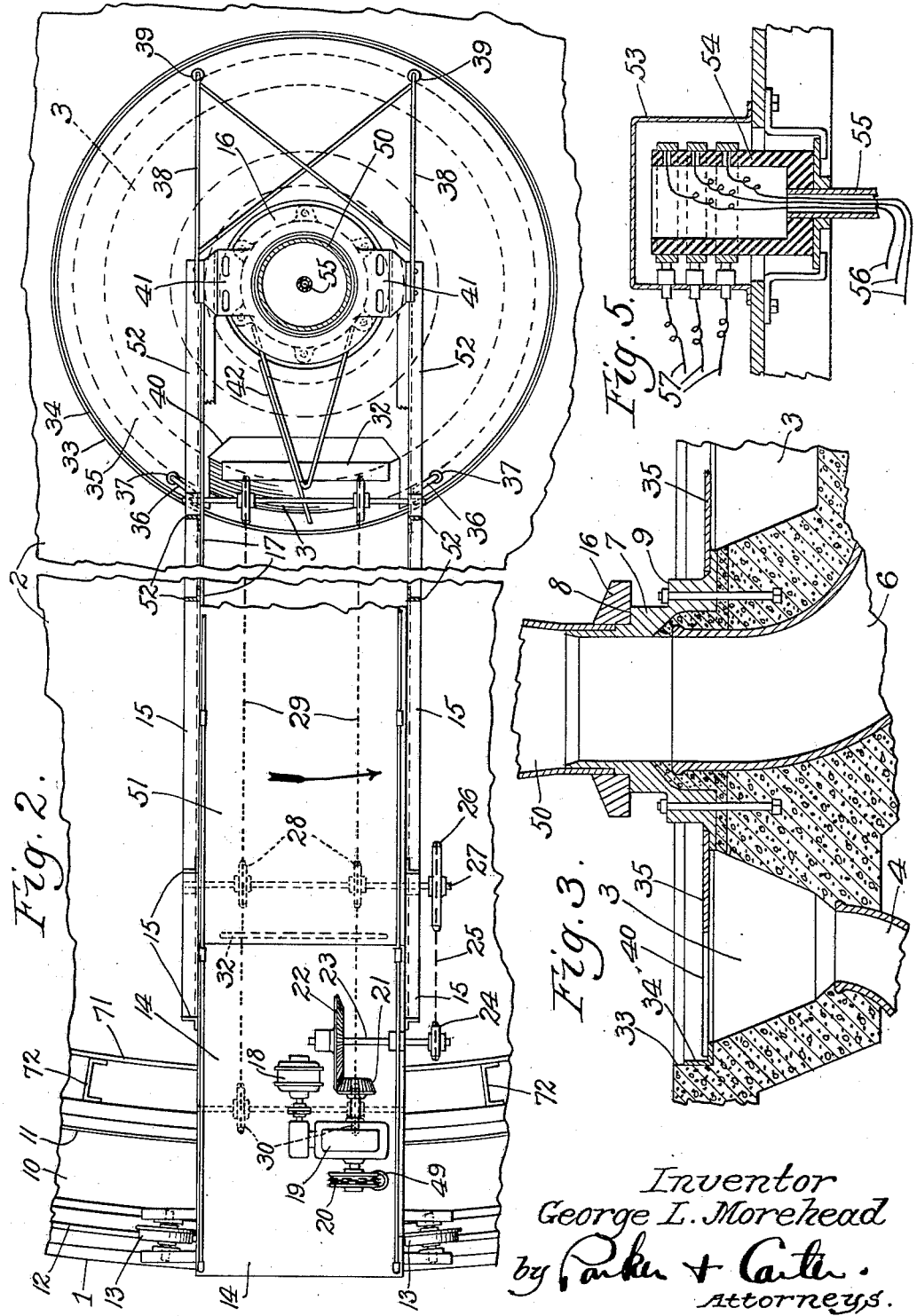
Inventor
George L. Morehead
by Parker + Carter
Attorneys.

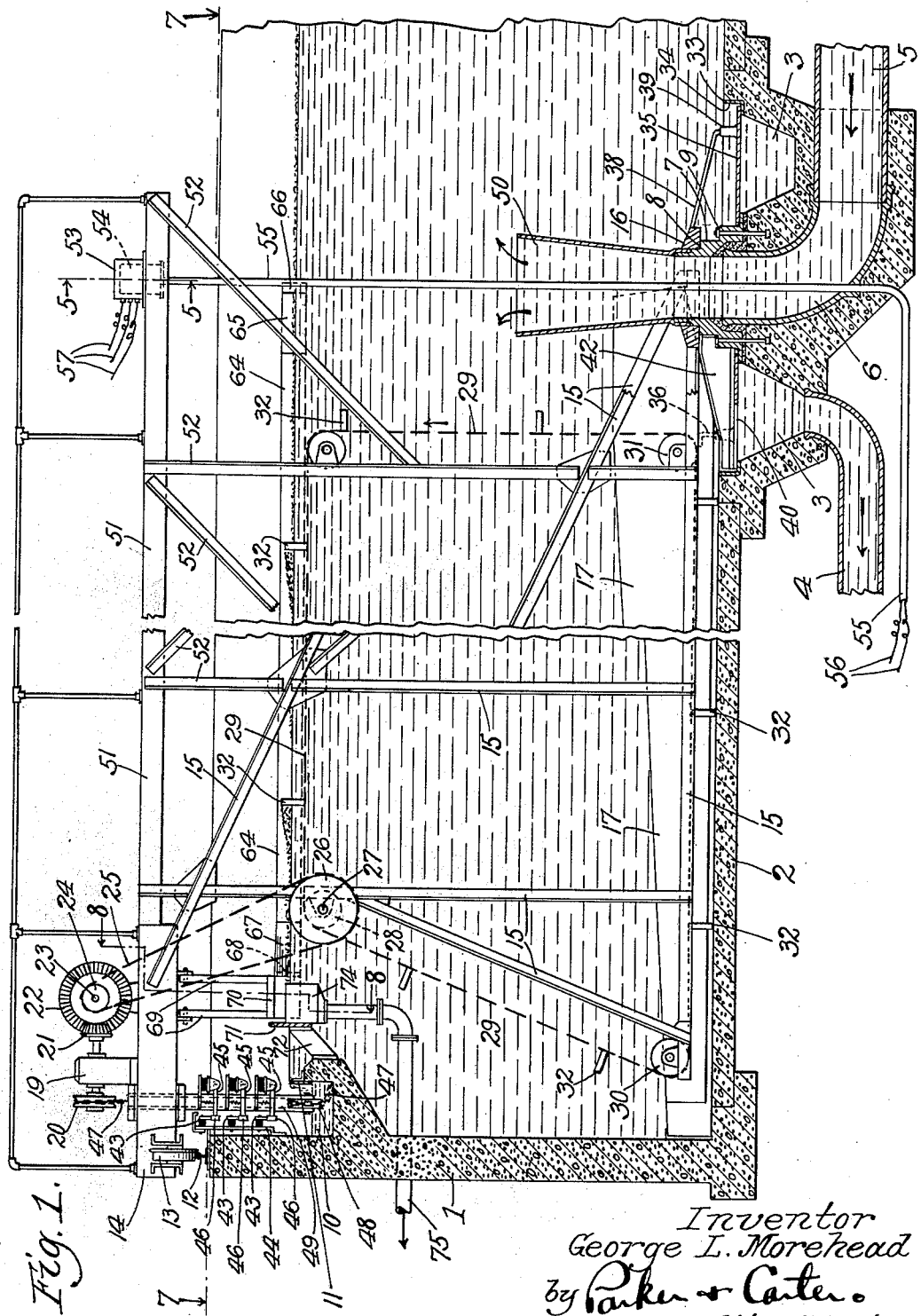

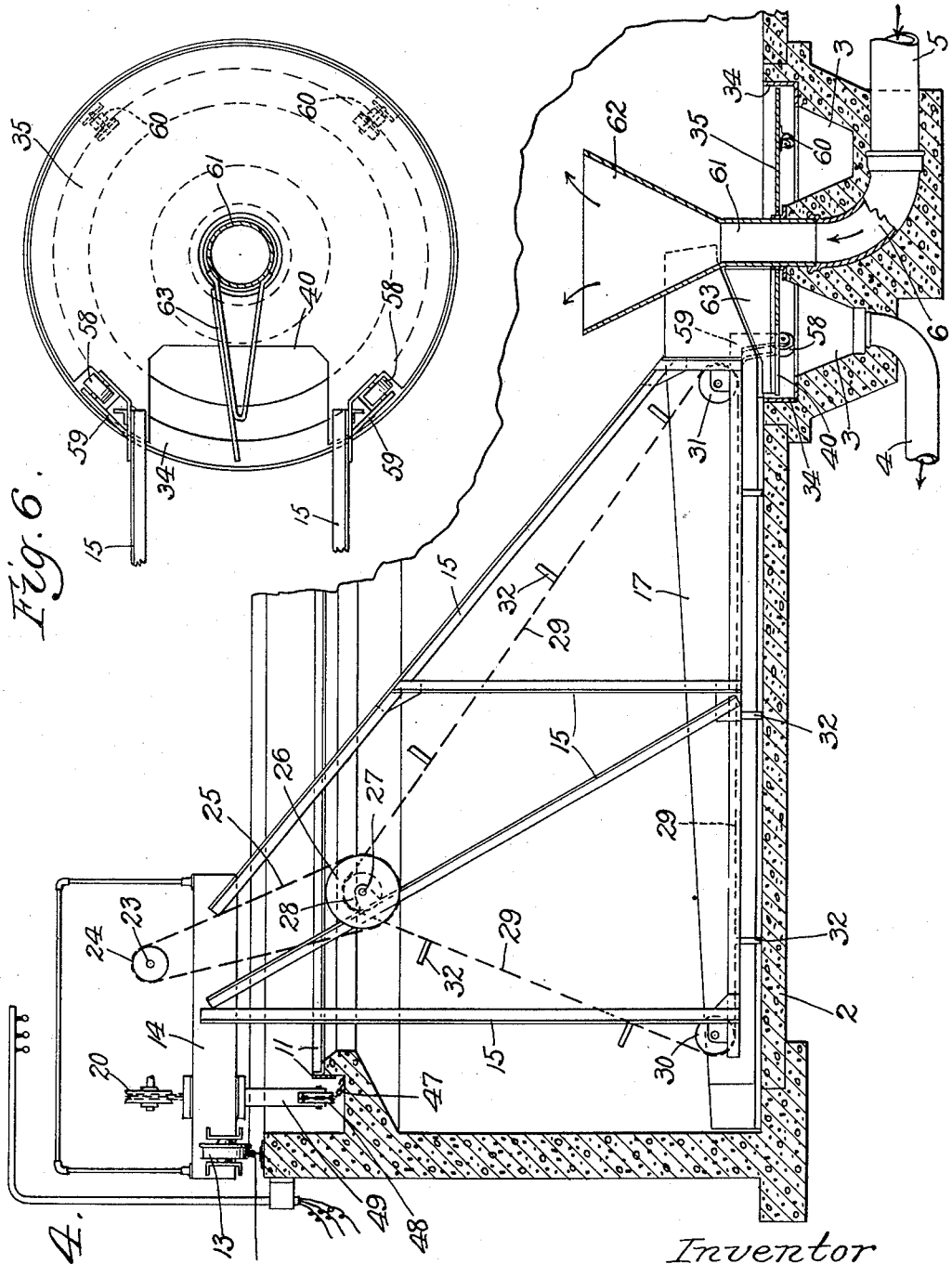

April 27, 1937.  G. L. MOREHEAD  2,078,266
CIRCULAR COLLECTOR
Filed July 12, 1935  4 Sheets-Sheet 4
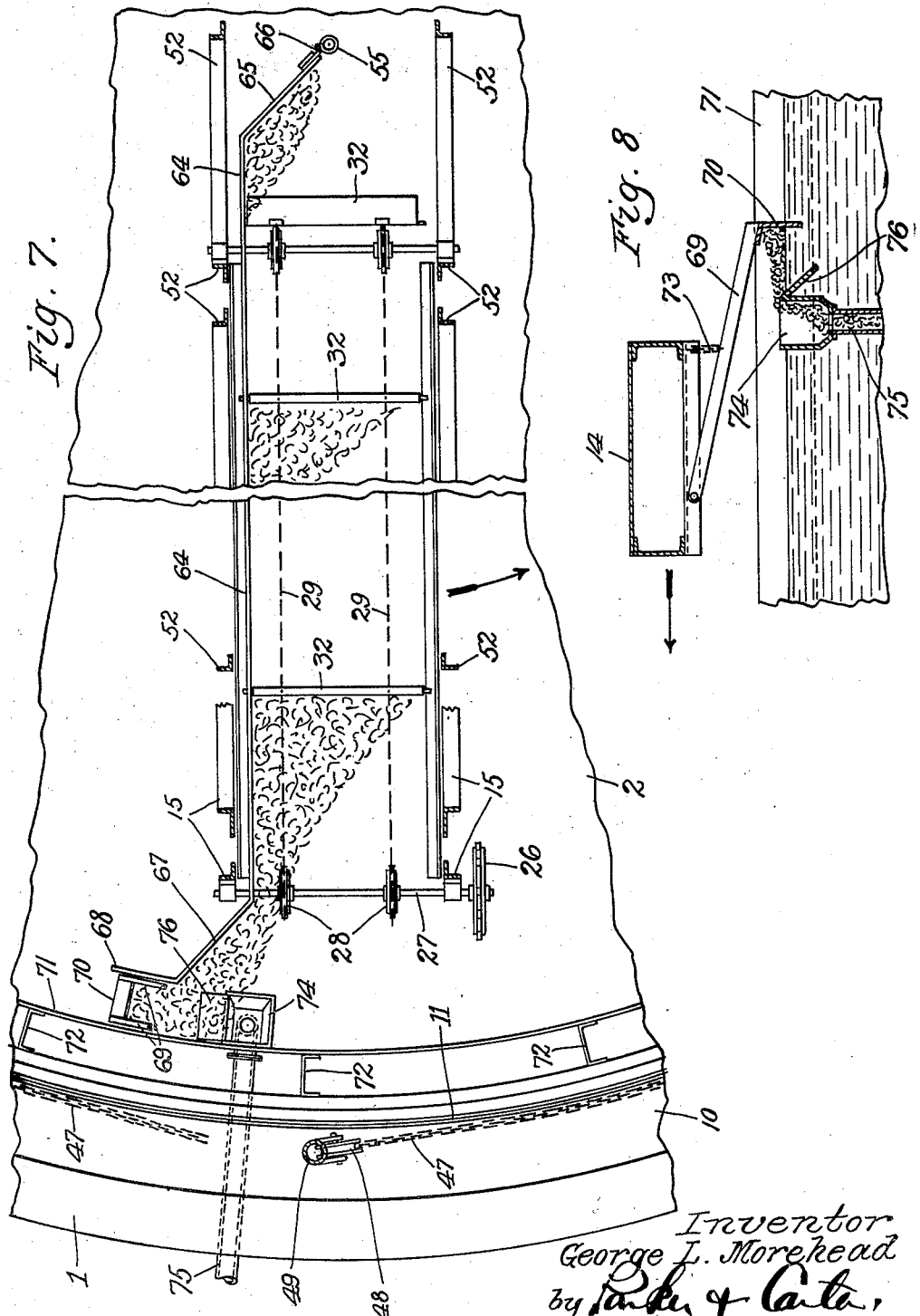
Inventor
George L. Morehead
by Parker & Carter,
Attorneys.

Patented Apr. 27, 1937

2,078,266

UNITED STATES PATENT OFFICE 2,078,266

CIRCULAR COLLECTOR

George L. Morehead, Philadelphia, Pa., assignor to Link-Belt Company, Chicago, Ill., a corporation of Illinois Application July 12, 1935, Serial No. 31,027

9 Claims. (Cl. 210—3)

This invention relates to a sewage treatment tank and in the form here shown comprises a sludge conveying assembly mounted for movement about a circular settling tank.

It has for one object to provide means for mounting and positioning the sludge conveying assembly independently of the influent nozzle or connection. Another object is to provide means for supporting the sludge conveying assembly in part upon the wall of the tank and in part upon the floor of the tank adjacent the influent connection.

Other objects will appear from time to time in the specification and claims.

The invention is illustrated more or less diagrammatically in the accompanying drawings, wherein:—

Figure 1 is a generally vertical section through a portion of the tank showing the conveyor assembly in position;

Figure 2 is a plan view of the conveyor assembly with parts of the skimmer assembly omitted;

Figure 3 is a detailed sectional view on an enlarged scale, showing a portion of the influent connection;

Figure 4 is a sectional view generally similar to Figure 1, showing a modified form;

Figure 5 is a transverse, generally vertical sectional detail taken at line 5—5 of Figure 1;

Figure 6 is a partial plan view of the form of the device shown in Figure 4;

Figure 7 is a section taken at line 7—7 of Figure 1;

Figure 8 is a sectional detail, taken at line 8—8 of Figure 1.

Like parts are designated by like characters throughout the specification and drawings.

1 is a tank wall. 2 is the floor of the tank. 3 is a generally annular sludge hopper provided with a sludge draw-off connection 4. 5 is an influent conduit which is connected to an elbow 6. The elbow 6 communicates, as shown generally in Figure 1 and in detail in Figure 3, with a member which may be cast or otherwise formed and comprises a tubular section 7 which is thickened at a point below its upper or discharge end to provide shoulders 8 and 9. The member 7 is mounted in or upon the floor of the tank as is also the elbow connection 6.

About its upper edge the tank is provided with an overflow trough 10 from which any suitable discharge connection may carry the material which spills over into the trough. An adjustable weir 11 may be provided about the edge of the tank. On the top of the tank wall 1 is mounted a concentric track 12. A pair of flanged rollers 13 are mounted to run upon the track 12 and to support one end of a bridge 14. A supporting structure 15 depends downwardly and extends toward the center of the tank from the bridge 14. At its inner and lower end the supporting structure 15 is fixed to a central ring 16 which rests upon the shoulder 8 of the member 7. Thus the bridge and the supporting structure 15 form a unitary assembly supported at its upper and outer end on the track 12 and at its lower, inner or central end by means of the ring 16 upon the shoulder 8. A sludge plow 17 is positioned along the lower edge of the supporting structure 15 and extends generally from the side walls of the tank to and across the annular sludge trough 3.

There is a motor 18 positioned on the bridge 14 which drives a reduction gear 19 which at one end drives a pocketed wheel 20. At its other end the reduction gear drives a beveled pinion 21 which meshes with a second beveled pinion 22 upon the shaft 23. A driving sprocket 24 is mounted upon the shaft 23. The sprocket 24 by means of a chain 25 drives a sprocket 26 on a shaft 27, which shaft carries a pair of chain driving sprockets 28, 28, each of which engages a chain 29. The chains pass about idler sprockets 30 mounted generally at the outer lower end of the supporting structure 15 and they pass about other idler sprockets 31, 31 mounted generally at the inner, lower end of the supporting structure 15. Mounted to extend between the chains 29 are flights 32. The conveyor comprising the chain and flights moves in the direction of the arrow shown in Figure 1 and thus moves sludge which has collected on the bottom of the tank toward and into the sludge trough.

About the outer edge of the sludge trough or hopper is formed a shoulder 33 in which may be situated an angle 34 to form a track.

An annular cover plate 35 is provided for the sludge hopper and overlies the major portion of the hopper. It is supported at one side from the supporting structure 15 by arms 36 which fit into and engage with socket members 37 in the cover plate. Generally opposite these arms and sockets other arms 38 extend downwardly from the ring 16 and by means of sockets 39 engage and support the sludge hopper cover. Thus this cover forms a part of the bridge assembly and moves with it. The hopper cover is cut away as at 40 so that material moved centrally by the conveyor flights 32 can be deposited through the opening 40 into the sludge hopper or trough 3.

While the supporting structure 15 may be attached to and supported upon the ring 16 in any manner, in the form shown in Figure 2 that ring is provided with lateral extensions 41, 41 upon which the side members of the supporting structure 15 rest and to which they are attached.

As a means for scraping the top of the cover plate 35 it is provided with a fixed plow 42 which overlies the plate 35 and as shown in Figure 1 is so shaped that it passes under the sludge plow 17.

In order to furnish current to operate the motor a collector system as shown in Figure 1 is provided. As there shown the collector system comprises three conductors 43 which may be mounted upon a bracket 44 fixed on the inner wall of the tank above the water level. An equal number of collector arms 45 is provided and these arms carry contact members 46 which contact the members 43. By suitable wires and conduits not here shown in detail, current is furnished to the members 43 from any suitable source and also by suitable wires or conduits not here shown the current picked up by the collectors is transmitted to the motor 18. By this mechanism, as the bridge assembly moves about the tank, current is always available through the collector system. The details of this particular collector system are not shown as they form no essential part of the present invention and other current furnishing means might be provided.

While the bridge might be caused to turn about the tank in any desired manner it is here shown as being moved by the motor and by the pocketed wheel 20 which engages an endless chain or cable 47 which lies within the overflow trough 10, passes up over a sheave 48 and through a hollow tube 49. As shown in Figure 2 this tube also carries the collector arms for the collector system.

The influent, after passing through the elbow 6, may be discharged into the tank in any manner and through any desired nozzle or outlet opening member. In the form shown in Figures 1 and 2 a slightly flared or conical member 50 is used.

For some installations the conveying assembly just described including in general the bridge, the supporting mechanism, the sludge plow and the conveyor, may be used alone. For other purposes the skimming conveyor or assembly, which is shown superimposed upon the supporting structure 15 may be used. This second supporting structure which will now be described may thus either be used or omitted. When it is used it forms in effect a unit with the bridge and conveying assembly already described.

The second conveyor supporting assembly, when present, comprises a bridge structure 51 which forms in effect a continuation of the bridge 14. It extends inwardly slightly beyond the center of the tank and is supported from the structure 15 by a second supporting structure 52 which comprises necessary frame and bracing members. The bridge 51 carries a current collector 53 which encloses a current distributor 54 which latter is carried upon a hollow or tubular support 55 extending upwardly through the elbow 6 and the nozzle 50. The support is preferably fixed in the foundation as indicated in Figure 1 and encloses an electrical conductor 56 which is connected to the current distributor 54. By this means electrical current may be brought upwardly to the current distributor from any suitable source and is carried from the distributor to the motor through a cable or conduit 57. It is to be understood that where the current collector assembly just described is used, the trolley mechanism heretofore described will ordinarily not be used. In other words, only one means is normally necessary for supplying current to the motor on the bridge assembly and while both are shown here, ordinarily but one will be used.

Ordinarily where the upper conveyor assembly 51, 52 is used, a skimming conveyor or device is mounted upon it at such height as to skim and convey material which has collected upon the surface. This may be an additional conveyor or may be formed as part of the radially moving conveyor already described. It is shown in that form herewith and the upper run of the conveyor acts as a skimmer moving material radially away from the center of the tank while the lower run acts as a conveyor moving material radially toward the center of the tank for discharge into the sludge hopper or trough.

In the modified form shown in Figure 4, the construction of the tank is substantially the same as that described above in connection with the showing of Figure 1 and so also is the bridge assembly comprising the bridge 14, and the supporting structure 15, but the upper supporting structure carrying the skimmer part of the conveyor has been omitted so that the conveyor acts only as a sludge conveyor effective on the bottom of the tank to move the sludge radially inwardly to the sludge hopper or trough. The driving mechanism for the conveyor is the same as above described and so also is the means for moving the bridge assembly. The bridge assembly, however, instead of being supported at its inner end upon a collar or ring about the influent nozzle, is supported upon a pair of rollers 58 which are carried in supporting brackets 59 positioned at the inner end of the supporting structure 15. These rollers run on the track members 34 which are positioned about the outer edge of the annular sludge trough or hopper. The cover plate 35 is the same as shown and described in connection with the earlier figures. It is cut away as at 40 to permit discharge of the material from the radial conveyor through it into the sludge hopper, and the cover plate may also carry supporting rollers 60, which run upon the track 34.

Communicating with the elbow 6 is an influent conduit 61 which may terminate in an outwardly flared or generally conical nozzle portion 62. Fixed to the member 61 is a sludge plow 63 generally similar to the plow 42, since it overlies the cover plate 35 and is effective to scrape material from the cover plate as the latter moves under the plow.

It is to be understood that either form of bridge, for example that shown in Figure 1 or that shown in Figure 4, might be supported upon wheels or rollers or upon a collar or ring about or adjacent the influent nozzle, and while each form of bridge assembly is shown with one support, each might be supported upon the support shown with the other form.

As shown in Figures 1 and 7, there may be mounted upon the bridge assembly a scum plow 64. It is preferably positioned along one side of the supporting structure 15 and extends somewhat above and somewhat below the water level. As shown in Figure 7 as the bridge assembly moves about the tank the plow 64 is in rear of the chains 29 and their flights 32, so that the plow 64 and flights 32 together serve to collect and to convey scum as indicated in Figures 1 and 7 in particular. The scum plow adjacent its inner end may have the bent portion 65 provided with the flexible wiper 66 to engage the member 55, and at its outer end may have a rearwardly bent portion 67 terminating in a portion 68, which in the case of a round tank may be bent concentrically with that tank or may be straight if desired. Hinged to the bridge 14 are a pair of rearwardly extending arms 69, which carry a scraper or plow section 70. This movable plow section lies between the portion 68 of the plow and the scum baffle plate 71 positioned above the tank upon supports 72 and spaced inwardly from the adjustable weir 11. A check chain 73 may be provided by means of which the downward movement of the movable plow section 70 is limited.

The mechanism above described will collect scum from the surface of the tank and move toward the edge or periphery as the bridge assembly is moved about the tank. While any means may be provided for discharging the scum so collected, one suitable form is illustrated herewith. It is preferably a fixed scum trough 74 from which a scum outlet pipe 75 conveys the scum to any suitable discharge or disposal point. The scum trough is provided on one side with the inclined surface member 76. As shown particularly in Figure 8, when the bridge assembly passes about the tank, moving in the direction of the arrow shown in Figures 7 and 8, the movable plow section 70, carrying scum with it, contacts and rides upwardly upon the member 76 and so scrapes and discharges the scum into the scum trough 74. The plow 70 remains in the raised position until it has passed completely over the scum trough. Then it is no longer held up and falls or moves downward to the full line position shown in Figure 8, its downward movement being limited by the check chain 73 and it extends downwardly below the surface of the liquid within the tank and forms a continuation of the plow member as a whole, preferably extending downwardly as far as does the plow.

While the invention in the form shown herewith is adapted primarily for use as a settling and separating tank for treating sewage and liquid wastes and for removing scum from the surface of the liquid treated, as well as for removing settled and settling solids from the body of the liquid, it is not limited to this use and might be used for the treatment of minerals and for treatment of other materials which are neither sewage nor other liquid wastes. Where the expression "settled solids" occurs in the claims it is to be taken as meaning those solids which have settled or which are in the process of settling upon or toward the bottom of the tank. The tank is filled with liquid carrying solids and these solids settle toward the bottom of the tank. The sludge plow and the conveyor move the solids toward the sludge trough or hopper for removal and in this process not only the material which has settled and which is resting upon the bottom of the tank, but some material which is in process of settling will also be carried toward and discharged in the sludge hopper and the expression "settled solids" is to be taken as including, therefore, both the material which has actually settled upon the bottom or floor of the tank and other material which, while it has not yet completely settled, is in process of settling.

I claim:

1. In combination in a tank adapted to receive liquid, a liquid inlet member in the bottom of the tank spaced from the walls thereof and means for removing settled solids from the tank, comprising a fixed trough, a discharge from it and means for moving said solids to said trough, comprising a movable conveyor assembly mounted within the tank and means for moving it, said assembly resting in part upon the floor of the tank about said liquid inlet member and in part upon the tank wall.

2. In combination in a tank adapted to receive liquid, a liquid inlet member and means for removing settled solids from the tank, comprising a fixed trough, a discharge from it and means for moving said solids to said trough, comprising a movable conveyor assembly mounted within the tank and means for moving it about a vertical axis of rotation adjacent one end thereof, said assembly resting at a plurality of points upon the tank structure, the conveyor assembly including a radially disposed plow and a plurality of conveyor flights and means for driving them along the face of the plow in the direction of the fixed trough.

3. In combination in a tank adapted to receive liquid, a liquid inlet member in the bottom of the tank spaced from the walls thereof and means for removing settled solids from the tank, comprising a fixed trough, a discharge from it and means for moving said solids to said trough, comprising a movable conveyor assembly mounted within the tank and means for moving it about a vertical axis of rotation adjacent one end thereof, said assembly resting in part upon said inlet member and in part upon the tank wall, the conveyor assembly including a radially disposed plow and a plurality of conveyor flights and means for driving them along the face of the plow in the direction of the fixed trough.

4. In combination in a tank adapted to receive liquid, a liquid inlet member and means for removing settled solids from the tank, comprising a fixed trough, a discharge from it and means for moving said solids to said trough, comprising a movable conveyor assembly mounted within the tank and means for moving it, said assembly resting at a plurality of points upon the tank structure, said assembly carrying a conveyor comprising flights and means for driving the conveyor to move the conveyor flights in the direction of the fixed trough, said conveyor having an upper and a lower run, the upper run positioned near the surface of the liquid and moving floating material toward the periphery of the tank, the lower run positioned near the bottom of the tank and moving settled material toward the center.

5. In combination in a tank adapted to receive liquid, a liquid inlet member and means for removing settled solids from the tank, comprising a fixed trough, a discharge from it and means for moving said solids to said trough, comprising a movable conveyor assembly mounted within the tank and means for moving it, said assembly resting at a plurality of points upon the tank structure, said assembly carrying a conveyor comprising flights and means for driving the conveyor to move the conveyor flights in the direction of the fixed trough, said conveyor having an upper and a lower run, the upper run positioned near the surface of the liquid and moving floating material toward the periphery of the tank, the lower run positioned near the bottom of the tank and moving settled material toward the center, and a scum plow supported on the movable conveyor assembly adjacent the upper run of the conveyor and extending from a point adjacent the center of the tank to a point adjacent its periphery.

6. In combination in a tank adapted to receive liquid, a liquid inlet member in the bottom of the tank spaced from the walls thereof and means for removing settled solids from the tank, comprising a fixed relatively extended, open topped trough, a discharge from it and means for moving said solids to said trough, comprising a generally radially movable conveyor assembly mounted within the tank and including a chain and flight conveyor and means for moving it, said assembly resting in part upon said inlet member and in part upon the tank, and a cover for said trough, mounted to move with said conveyor assembly and having an opening in line with said conveyor.

7. In combination in a tank adapted to receive liquid, a liquid inlet member and means for removing settled solids from the tank, comprising a fixed trough, a discharge from it and means for moving said solids to said trough, comprising a movable conveyor assembly mounted within the tank and means for moving it, and a cover for said trough mounted to move with said conveyor assembly and having an opening in line with said conveyor and a fixed scraping member on said inlet member extending over and adapted to sweep said cover as it moves past said scraper.

8. In combination in a tank adapted to receive liquid, a liquid inlet member in the bottom of the tank spaced from the walls thereof and means for removing settled solids from the tank, comprising a fixed trough, a discharge from it and means for moving said solids to said trough, comprising a movable conveyor assembly mounted within the tank and means for moving it, said assembly resting in part upon said inlet member and in part upon the tank, and a cover for said trough, supported from and adapted to move with said conveyor assembly and having an opening in line with said conveyor, and a fixed scraping member on said inlet member extending over and adapted to sweep said cover as it moves past said scraper.

9. In combination in a tank adapted to receive liquid, a liquid inlet member in the bottom thereof spaced from the walls thereof, and means for removing settled solids from the floor of the tank including a fixed trough formed in the bottom of the tank encircling the liquid inlet member, a discharge leading from the trough, means for moving the solids to said trough comprising a movable conveyor assembly mounted within the tank, means for moving it, a cover for the trough movable with the conveyor assembly having an opening always in line with the conveyor, the cover being located entirely below the conveyor and in substantially horizontal alignment with the floor of the tank.

GEORGE L. MOREHEAD.